United States Patent [19]
Watanabe

[11] Patent Number: 4,635,293
[45] Date of Patent: Jan. 6, 1987

[54] IMAGE PROCESSING SYSTEM
[75] Inventor: Mutsumi Watanabe, Yokohama, Japan
[73] Assignee: Kabushiki Kaisha Toshiba, Kawasaki, Japan
[21] Appl. No.: 696,491
[22] Filed: Jan. 30, 1985
[30] Foreign Application Priority Data
Feb. 24, 1984 [JP] Japan ............................... 59-33581
[51] Int. Cl.$^4$ .............................................. G06K 9/32
[52] U.S. Cl. ....................................... 382/44; 382/6; 382/37; 382/48
[58] Field of Search .................... 382/6, 34, 37, 44, 48; 358/101, 107; 364/414

[56] References Cited
U.S. PATENT DOCUMENTS 3,905,045  9/1975  Nickel .................................... 382/6
4,200,861  4/1980  Hubach et al. ....................... 382/34
4,291,334  9/1981  Mese et al. ......................... 358/101
4,521,909  6/1985  Wang .................................. 382/34

Primary Examiner—Leo H. Boudreau
Assistant Examiner—Joseph Mancuso
Attorney, Agent, or Firm—Oblon, Fisher, Spivak, McClelland, & Maier

[57] ABSTRACT

According to the image self-alignment system of the present invention, desired partial image areas are extracted by a partial image area designator from a pair of to-be-aligned picture images used for, for example, medical purposes. Each partial image area is divided by an area divider into a plurality of image segments arranged in a matrix form. Each corresponding image segment pair is subjected to a first misalignment detection by using a first evaluation parameter called correlation coefficient data. Each image segment pair is then subjected to a second misalignment detection by using a second evaluation parameter including pixel density difference data for finer detection. The first and second picture images are automatically aligned based on highly reliable final misalignment data obtained by carrying out the first and second misalignment detections.

11 Claims, 4 Drawing Figures

IMAGE PROCESSING SYSTEM

BACKGROUND OF THE INVENTION

The present invention relates in general to an image processing technique and, more particularly, to a technique of aligning a plurality of picture images for image synthesis.

Recently, it has become important to synthesize a plurality of picture images, for example, two images picked up at different times. Some image processes apply to a medical imaging system such as a computed tomography (CT) scanner, which obtains an image of a selected plane section of a human body. One of these image processes obtains the difference between two images of a region of interest (e.g., an affected part) in the selected plane section in order to more clearly show a change in such a region over a period of time. Such an image process, considered as one of picture image synthesis, requires the precise alignment of two images to produce a subtraction image. Poor image alignment cannot result in a good subtraction image.

The simplest image alignment is based on the visual judgement of a human being. This alignment involves the comparison of two images, detection of misalignment (or mis-registration) between them, and transition of one of the images according to the misalignment. The image transition includes a simple coordinate conversion such as parallel transition, rotation, enlargement and reduction. This alignment technique is relatively effective when the misalignment, which is expressed in a vector quantity, is uniform over the entire image plane. A single picture image obtained for medical purposes (or a single satellite-transmitted picture image) is usually a complex of different sub-regions of an object so that the vector of the misalignment between two such picture images is hardly uniform over the entire image plane. That is, regional variations in misalignment vector often appear. In this case, the simple coordinate conversion technique cannot be effective in aligning two images over the entire image plane.

There is a known method for solving the problem. This method includes the steps of:

(1) Dividing both picture images of an object into several sub-image regions.

(2) Computing a correlation coefficient for each pair of corresponding sub-image regions of two picture images.

(3) Detecting the misalignment vector between that pair of sub-image regions which has the maximum correlation coefficient.

(4) Obtaining the misalignment over the entire image based on the detected vector. According to this method, however, when the misalignment between corresponding sub-image regions is significantly small or a contrast difference between two images is small, the variation in the correlation coefficients is considerably small. This reduces the detection sensitivity of the misalignment vector and deteriorates alignment accuracy as a consequence. In this case, if the images have noise components, the significance of the variation in the correlation coefficients may be counteracted. Such an adverse effect of the noise greatly decreases the alignment accuracy and may result in alignment error at the worst.

SUMMARY OF THE INVENTION

It is therefore an object of the present invention to provide a new and improved image processing technique for aligning, with higher accuracy, a pair of picture images such as those used for medical purposes or satellite-transmission.

It is another object of the present invention to provide a new and improved self-alignment technique for aligning a pair of such picture images with higher accuracy at higher speed.

According to the image self-alignment system of the present invention, first, a desired image region is extracted from each of a pair of picture images to be aligned. Each image region is divided into n x m image segments arranged in a matrix form, where n and m are positive integers. There are two steps in detecting misalignment between each pair of image segments to be compared. The first one (first misalignment detection mode) uses a first evaluation parameter called a correlation coefficient for rough misalignment detection. The other (second misalignment detection mode) uses a second evaluation parameter including data of the difference in pixel density for fine misalignment detection. Based on the final misalignment data between each image segment pair, which has been obtained with higher accuracy in these two modes, alignment between the associated two picture images is automatically performed.

BRIEF DESCRIPTION OF THE DRAWINGS

The present invention is best understood by reference to the accompanying drawings, in which.

DETAILED DESCRIPTION OF PREFERRED EMBODIMENT

Figure 1:
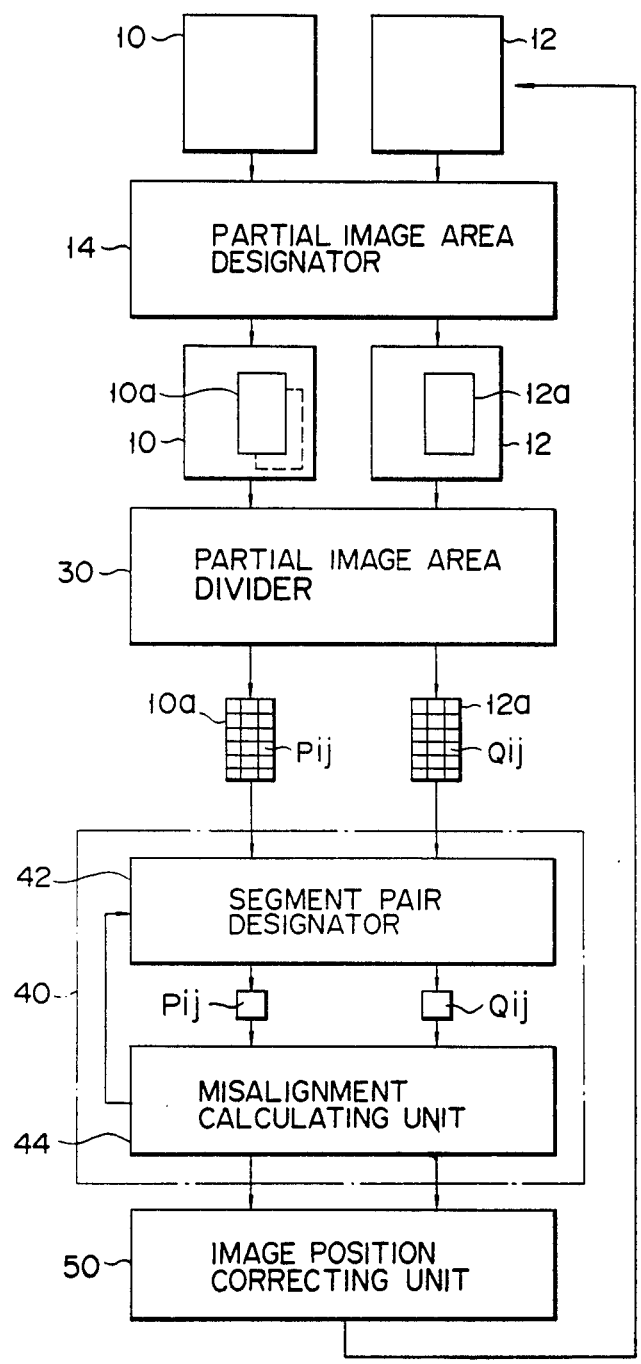
FIG. 1 is a block diagram showing the overall configuration of an image alignment device according to one embodiment of this invention.

With reference to FIG. 1, an automatic image alignment system according to one embodiment of the present invention will now be described. FIG. 1 exemplifies main units of the image alignment device and a process sequence of image data associated with these units.

In FIG. 1, a pair of picture images 10, 12, such as medical-purpose reconstructed tomographic images of a person, is subjected to image alignment. First, these images 10, 12 are supplied to a partial image area designator 14 which specifies desired partial image areas 10a, 12a in the respective images 10, 12. These partial image areas 10a, 12a are selected so as to include a characteristic that is relatively clear for detecting the overall misalignment of the image pair 10, 12. The "relatively clear characteristic" means a clearer difference in pixel density and higher contrast. For example, for medical purposes, an image area of the contour of a bone would be considered better qualified as the one with such a characteristic than that of soft tissues of organs.

According to this embodiment, the partial image areas 10a, 12a are specified by visual comparison by an operator as follows.

Figure 2:
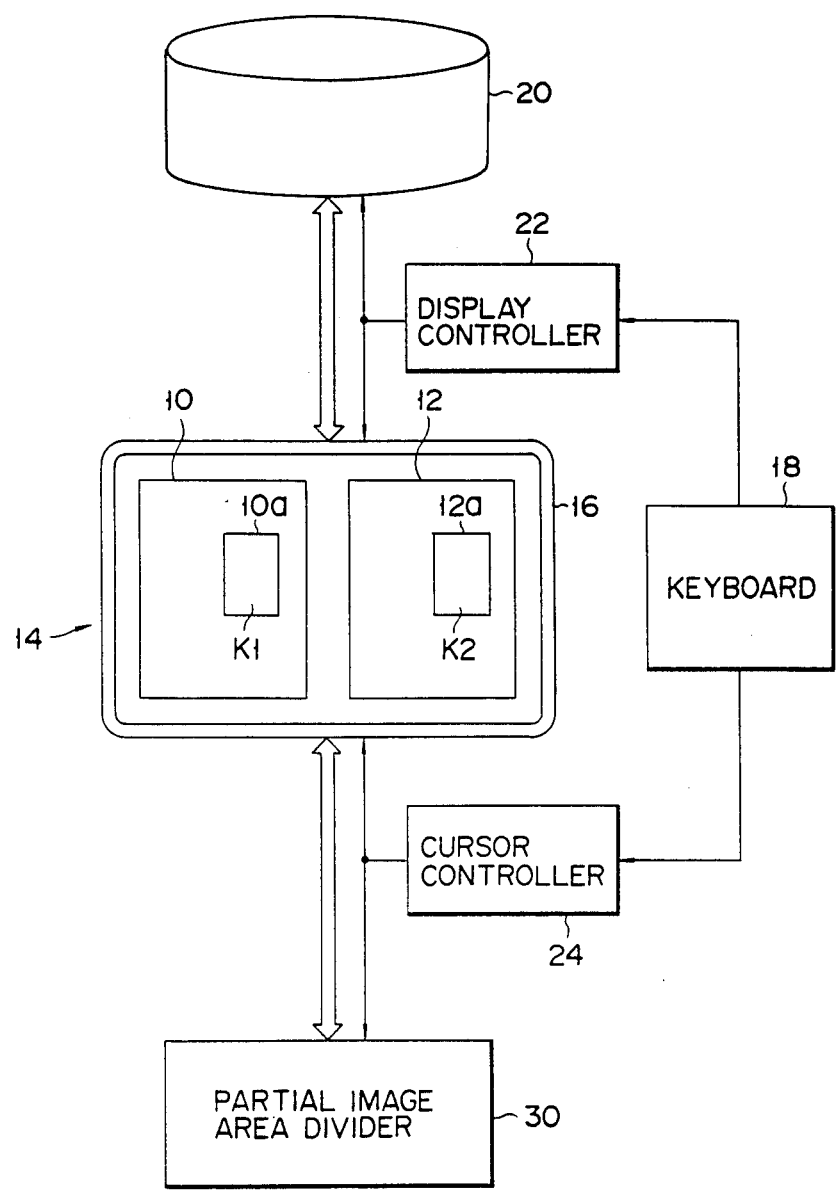
FIG. 2 is a block diagram illustrating the interior of a partial image area designating unit provided in the image alignment device of FIG. 1.

The partial image area designator 14 comprises a display terminal 16 for image display (see FIG. 2). When the operator inputs an instruction to display the images 10, 12 via a keyboard 18, the images 10, 12 are read out from a image filing unit 20 incorporating a recording medium such as a magnetic disk. The images 10, 12 are then transferred to the display terminal 16 under the control of a display controller 22. As shown in FIG. 2, the images 10, 12 to be aligned are simultaneously displayed on the screen of the display terminal 16. This facilitates visual comparison of those images by the operator. Then, the operator manipulates a specific key (not shown) on the keyboard 18 to move rectangular cursors K1 and K2 on the screen to desired locations (the partial image areas 10a, 12a) on the images 10, 12. The movement of the cursors K1, K2 is controlled by a cursor controller 24 connected to the keyboard 18. Each cursor has the same area as to-be-selected partial image areas. Consequently, the areas on the picture images 10, 12 occupied by the cursors K directly become the partial image areas 10a, 12a. This permits the operator to extract desired partial image areas on the associated images 10, 12 in real time.

The partial image areas 10a, 12a, designated by the partial image area designator 14, are supplied to a processor unit 30 where each partial image area is divided into a plurality of image units or segments. For this function, the processor unit 30 is called a partial image area divider hereafter. The image segments (n x m segments) of the partial image area 10a are expressed by "$P_{nm}$," and those of the partial image area 12a are expressed by "$Q_{nm}$." Those segments are affixed with matrix coordinates, which are used to manage each pair of corresponding image segments which are included in the respective partial image areas 10a, 12a.

Again in FIG. 1, a misalignment detecting unit 40 is located at the subsequent stage of the partial image area divider 30. The misalignment detecting unit 40 comprises a segment pair designator 42 and a misalignment calculating unit 44. The segment pair designator 42 sequentially designates segment pairs, one from each partial image area (10a, 12a), e.g., $P_{11}$ and $Q_{11}$, $P_{12}$ and $Q_{12}$, . . . , $P_{ij}$ and $Q_{ij}$. The misalignment calculating unit 44 computes a misalignment vector between each designated segment pair, for exmaple, $P_{ij}$ and $Q_{ij}$. This computation is based on an evaluation function with two different parameters, a correlation coefficient between the corresponding image segments $P_{ij}$, $Q_{ij}$ and a pixel density difference coefficient that is the sum of the absolute value of the difference in pixel densities between corresponding portions of the designated segment pair. (These parameters are hereafter called correlation data and pixel density difference data.) After the misalignment vector for each image segment pair, e.g., $P_{11}$ and $Q_{11}$, is calculated based on the evaluation function, it is supplied to a memory (to be described later). Then, the next image segment pair, e.g., $P_{12}$ and $Q_{12}$, is specified by the segment pair designator 42. The misalignment vector for this segment pair is calculated by the calculating unit 44 and is stored in the memory. The same calculation process is executed for every one of the associated image segment pairs, thus providing plural pieces of misalignment vector data for each segment pair of partial image areas (10a, 12a). These plural pieces of misalignment vector data are supplied to an image position correcting unit 50, which extracts reliable ones from the vector data for overall alignment of the picture images 10, 12. This unit 50 can also partially correct the picture images with a divided picture segment of an image plane used as a unit, as desired.

Figure 3:
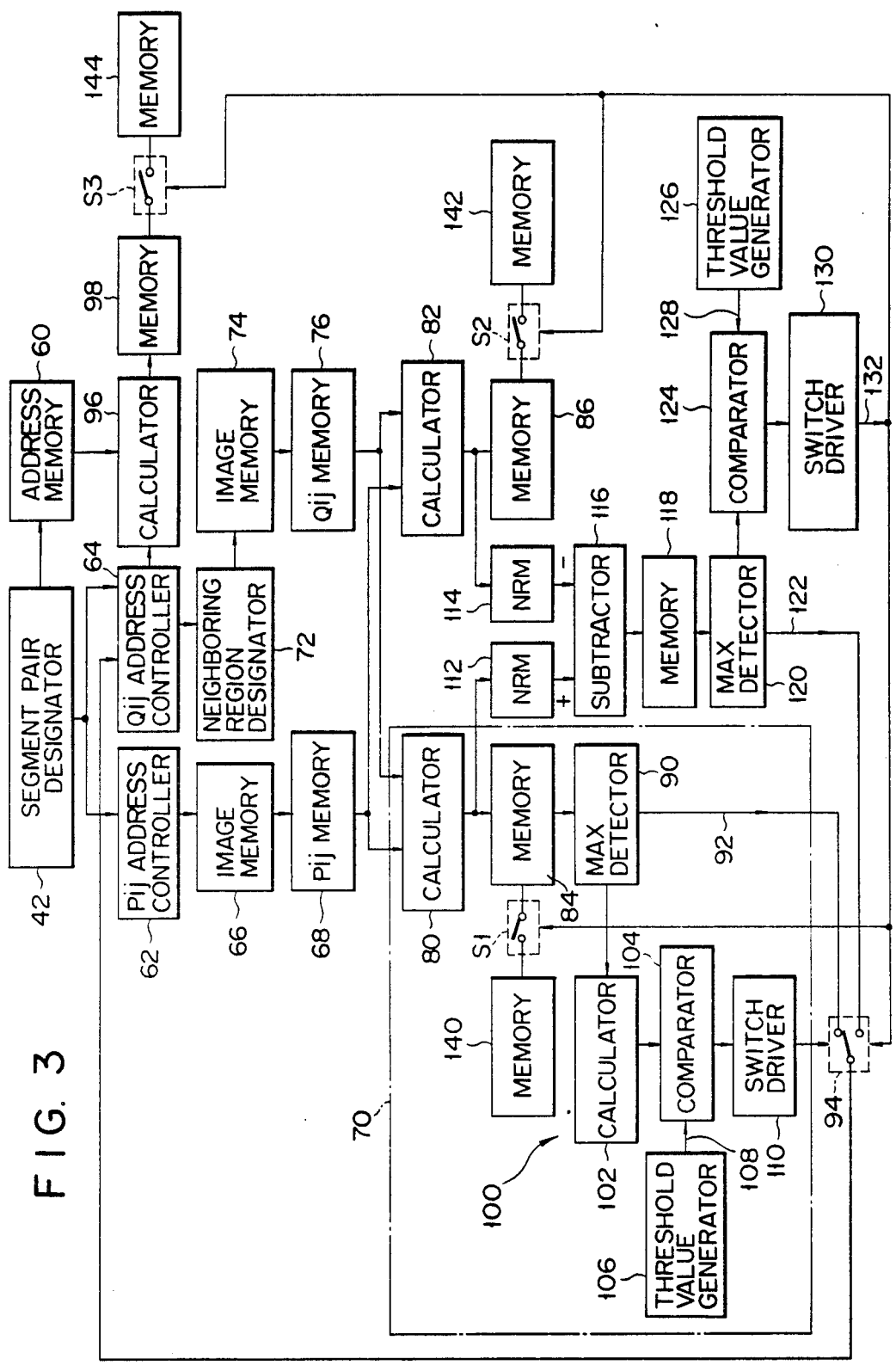
FIG. 3 is a block diagram depicting a detailed circuit configuration of a misalignment detecting unit provided in the image alignment device of FIG. 1.

FIG. 3 is a detailed illustration of the interior of the misalignment detecting unit 40. The segment pair designator 42 is connected to an initial address memory 60 and address controllers 62, 64. The memory 60 stores center addresses of the partial image areas 10a, 12a. The address controller 62 ($P_{ij}$ address controller) stores data of the sizes (unit areas) of image segments $P_{ij}$ of the partial image area 10a and center addresses of the individual segments. The other address controller 64 ($Q_{ij}$ address controller) stores center address data and size data of image segments $Q_{ij}$ of the partial image area 12a.

The $P_{ij}$ address controller 62 is coupled to a $P_{ij}$ image segment memory 68 through a first image memory 66, which stores the first image picture 10. Based on the address data, the $P_{ij}$ address controller 62 reads out the image picture from the first image memory 66 and extracts a specific image segment $P_{ij}$. The extracted image segment $P_{ij}$ is stored in the image segment memory 68. The $Q_{ij}$ address controller 64 supplies the size data and central address data of an image segment $Q_{ij}$ of the second image picture 12 to a neighboring region designator 72 under the control of a coarse misalignment detecting circuit 70. The neighboring region designator 72 extracts an image segment with the specified size and the specified address being in the center from the image picture 12 stored in a second image memory 74. The extracted image segment $Q_{ij}$ is stored in a segment memory 76 ($Q_{ij}$ image segment memory) coupled to the second image memory 74. This pair of image segments $P_{ij}$ and $Q_{ij}$, respectively stored in the image segment memories 68, 76, is used for detection of the misalignment vector between the image pictures 10, 12 and position correction.

Each of the image memories 68, 76 is coupled to calculators 80, 82. The calculator 80 sequentially calculates the correlation data, i.e., the first evaluation parameter, while the calculator 82 sequentially calculates the pixel density difference data (the second evaluation parameter). The image segment information stored in each of the image memories 68, 76 is parallel-transmitted to those calculators 80, 82, which, in turn, respectively calculate the correlation data and pixel density difference data for the image segment pair $P_{ij}$ and $Q_{ij}$. The calculated correlation data and pixel density difference data are respectively stored in a correlation data memory 84 and a pixel density difference memory 86. This data process is repeated for neighboring regions around the image segment designated by the neighboring region designator 72. That is, while shifting the image segment $Q_{ij}$ by a small amount on the image plane around the initial position, the correlation data between the image segment $Q_{ij}$ and image segment $P_{ij}$ (stationary) is sequentially calculated.

The correlation data calculator 80 and correlation data memory 84 are included in the coarse misalignment detecting circuit 70. The memory 84 is coupled to a maximum detector 90, which detects the maximum correlation data among those stored in the memory 84 and generates an address signal 92 representing the center address of the image segment ($Q_{ij}'$) having the maximum correlation data. The correlation coefficient between the image segment $P_{ij}$ and the image segment $Q_{ij}'$ within the shifting range of the segment $Q_{ij}$ is maximum.

The address signal 92 is transmitted to the $Q_{ij}$ address controller 64 through a switch 94 that is in a first electrical mode as shown in FIG. 3. The $Q_{ij}$ address controller 64 supplies new center address data of the neighboring image segment $Q_{ij}'$ to the neighboring region designator 72 and a displacement calculator 96, which is coupled to the initial address memory 60 and the $Q_{ij}$ address controller 64. The displacement calculator 96 calculates the displacement between the center address of the initial image segment $Q_{ij}$, stored in the initial address memory 60, and the center address of the image segment $Q_{ij}'$, represented by the signal 92 obtained in the coarse misalignment detecting circuit 60. The displacement or displacement vector data between the center addresses of the image segments $Q_{ij}$ and $Q_{ij}'$ is stored in a displacement memory 98. Based on the calculated displacement, the $Q_{ij}$ address controller 64 supplies the new center address data of the image segment $Q_{ij}$ to the neighboring region designator 72.

The coarse misalignment detecting circuit 70 includes a switch controller 100, which detects the maximum (converged) correlation data among the all the correlation data obtained with the image segment $Q_{ij}$ being shifted around. At this time, the detecting circuit 70 controls the switch 94 to prevent the supply of the address signal 92 to the $Q_{ij}$ address controller 64. In the case where the correlation coefficients between the image segment pair $P_{ij}$, $Q_{ij}$ are sequentially calculated for the segment $Q_{ij}$ being shifted, a gradual decrease in a change in the calculated correlation data can mean that the correlation data is approaching (or converging with) the maximum correlation data. When the variation in the correlation data over a period of time falls below a predetermined threshold level, i.e., when the maximum correlation data is converged, the switch controller 100 switches the switch 94 to end the coarse misalignment detection mode. The switch controller 100 serves to maintain the coarse misalignment detection (first misalignment detection) for the image segment pair $P_{ij}$, $Q_{ij}$ as long as the change in the correlation data is above the threshold level. When the change in the correlation data for the image segment pair $P_{ij}$, $Q_{ij}$ decreases to fall below the threshold level, the coarse misalignment detection is completed and the fine misalignment detection (second misalignment detection) starts. In this embodiment, the fine misalignment detection further uses the pixel density difference data (the second evaluation parameter). The following description discusses the arrangement of the switch controller 100 and explains the fine misalignment detection.

A variation calculator 102 is connected to the maximum detector 90 to sequentially calculate temporal changes in the maximum coefficient data for the associated image segment pair. The obtained data of the temporal changes in the maximum coefficient data is supplied to a data comparator 104 connected to a threshold value generator 106 that prestores the threshold value 108. The comparator 104 compares the reference threshold value 108 with the variation in the maximum correlation data that is an actual value. When the variation becomes smaller than the threshold value, the comparator 104 supplies a changeover instruction signal to a switch driver 110, which is connected to the switch 94. In response to this signal, the switch driver 110 switches the switch 94 from the first electrical mode to a second electrical mode, which prevents the address signal 92 of the coarse misalignment detecting circuit 70 from passing the switch 94. This completes the first misalignment detection.

Suppose the evaluation parameter or evaluation function used in the second (fine) misalignment detection is represented by "P(xy)" which is given by:

$$P(xy) = S(xy) - kx \cdot E(xy),$$

where
S(xy): data obtained by normalizing the correlation data calculated in the correlation data calculator 80,
E(xy): data obtained by normalizing the pixel density difference data,
x, y: coordination on the image plane,
kx: weighing parameter (positive).

The greater S(xy) or the smaller E(xy) is, the greater thus the defined function P(xy) becomes. P(xy) has a maximum of 1.0 only when the image segment pair matches ideally.

Two normalizer circuits 112 and 114 are respectively coupled to the correlation data calculator 80 and pixel density difference data calculator 82. The normalizers 112, 114 serve to compute the normalized data S(xy) and E(xy) based on the data from the calculators 80, 82. The normalizers 112 and 114 supply the data S(xy) and E(xy) to a subtractor circuit 116, which performs a subtraction on S(xy) and E(xy) to obtain the evaluation function P(xy) for fine misalignment detection. Thus attained P(xy) is stored, together with the center address (X, Y) of the corresponding neighboring region, in a memory 118 located at the succeeding stage of the subtractor 116.

This process of obtaining P(xy) is repreated wherein one image segment $Q_{ij}$ of the image segment pair, the coarse alignment detection of which has been completed, is finely shifted on the same image plane under the control of the $Q_{ij}$ address controller. Plural pieces of evaluation function data P(xy) obtained in each process are sequentially stored in the memory 118. A second maximum detector 120 coupled to the memory 118 detects the maximum one, P(xy)max, among the stored P(xy) and generates a second address signal 122 representing the center address of an image segment $Q_{ij}''$ which has yielded P(xy)max. This address signal 122 is fed back to the $Q_{ij}$ address controller 64 via the switch 94 in the second electrical mode. Like in the coarse misalignment detection mode, the displacement calculator 96 calculates the displacement between the initial center address and the center address of the image segment $Q_{ij}''$.

The maximum detector 120 is connected to a comparator 124 connected to a threshold value generator 126, which prestores a threshold value 128 for the evaluation function. The comparator 124 compares the threshold value 128 with evaluation function data that is an actual value. When the change in the actual evaluation function data decreases to fall below the threshold value, it can be considered that a final matching between the associated the image segments $P_{ij}$, $Q_{ij}$ has substantially occurred. Thus, the comparator 124 supplies a misalignment detection end signal 132 to a switch driver 130 connected to the switch 94. In response to the signal 132, the switch 94 changes to the original electrical mode from the second electrical mode. This completes the second (fine) misalignment detection and makes the image processing device ready for the coarse misalignment detection for the next image segment pair, for example, $P_{i+1,j}$ and $Q_{i+1,j}$.

The switch driver 130, operable in the fine alignment detection mode, is coupled to three transmission switches S1, S2, S3. The first data transmission switch S1 is provided between the correlation data memory 84 and a final (converged) correlation data memory 140. This memory 140 exclusively stores final correlation data (converged in the coarse misalignment detection mode) with address data specifying the image segment pair which has yielded that final correlation data. The second data transmission switch S2 is provided between the pixel density difference data memory 86 and a final (converged) pixel density difference data memory 142. The memory 142 exclusively stores converged pixel density difference data, which is also affixed with address data specifying the image segment pair that has yielded that pixel density difference data. The third data transmission switch S3 is provided between the displacement memory 98 and a final misalignment data memory 144. This memory 144 exclusively stores misalignment vector data finally yielded through the first and second misalignment detection modes. This misalignment vector data is also affixed with address data specifying the image segment pair which has yielded that particular vector data. These switches S1, S2, S3 become conductive in response to the misalignment detection end signal 132 from the switch driver 130. Therefore, upon completion of the fine misalignment detection, all the final data is stored in the memories 140, 142, 144.

The misalignment detection for the next image segment pair, e.g., $P_{i+1,j}$ and $Q_{i+1,j}$, is also carried out in two steps; namely, the coarse and fine misalignment detection modes. These two steps are repeated for every corresponding image segment pair of the partial image areas 10a, 12a. As a result, regional misalignment vector data for every image segment pair $(P_{11}, Q_{11})$, . . ., $(P_{ij}, Q_{ij})$, . . . , $(P_{nm}, Q_{nm})$ can be obtained.

The image position correcting unit 50 determines an optimum alignment for the picture images 10, 12 based on the regional misalignment quantities between these picture images, i.e., misalignment quantities between all the image segment pairs. The following is an explanation of the position correction executed by the unit 50.

Figure 4:
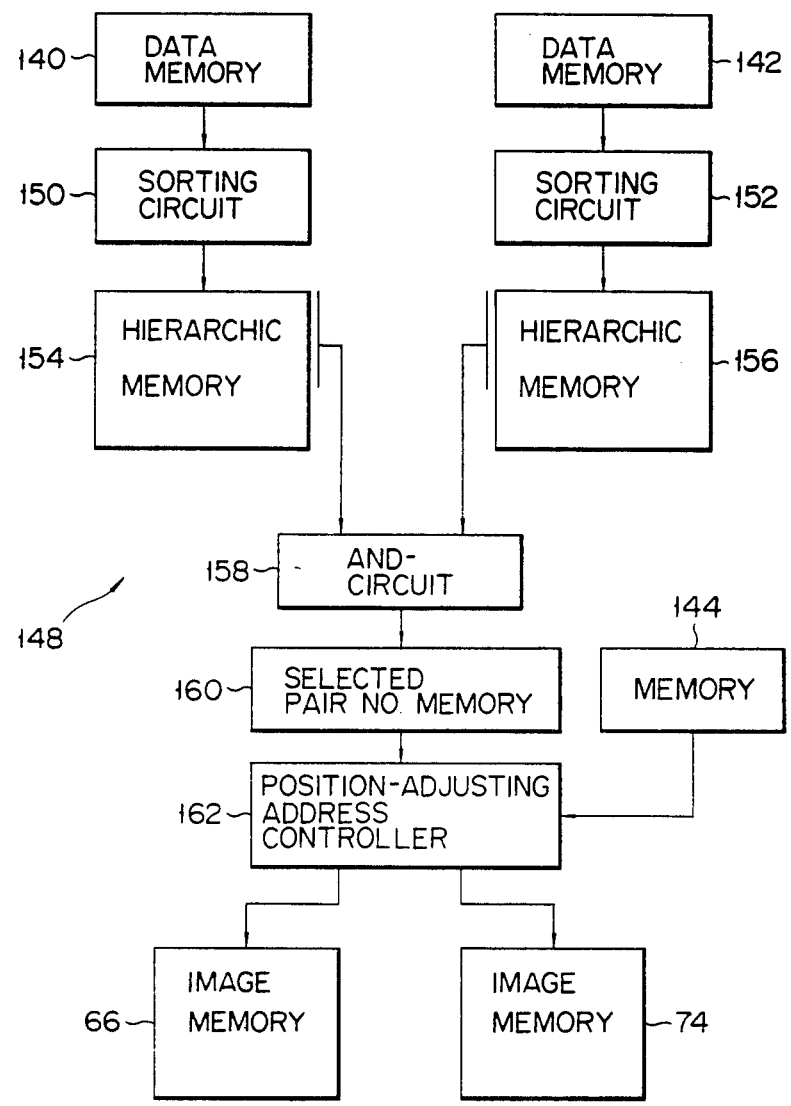
FIG. 4 is a block diagram showing the interior of a misalignment correcting unit provided in the image alignment device of FIG. 1.

FIG. 4 is a detailed illustration of the interior of the position correcting unit 50. The position correcting unit 50 includes a reliable misalignment data search circuit 148 which searches plural pieces of misalignment vector data, obtained by repeating the misalignment detection for all the image segment pairs, for the one with the highest reliability. As shown in FIG. 4, the search circuit 148 includes two sorting circuits 150, 152 which are respectively coupled to the converged correlation data memory 140 and the converged pixel density difference data memory 142. The sorting circuit 150 receives plural pieces of converged or final correlation data for plural pieces of image segment pairs $P_{ij}$, $Q_{ij}$ and sorts the correlation data in order from the largest to the smallest, thus providing a hierarchical sequential organization. Consequently, the correlation data is stored in a hierarchic memory 154, located at the succeeding stage of the sorting circuit 150, in order from the largest to the smallest. This forms a hierarchic structure for the plural pieces of correlation data obtained for the corresponding image segment pairs $P_{ij}$, $Q_{ij}$ of the partial image areas 10a, 12a. The other sorting circuit 152 receives plural pieces of converged or final pixel density difference data for the same plural pieces of image segment pairs $P_{ij}$, $Q_{ij}$ and sorts the pixel density difference data in order from the smallest to the largest. Therefore, the pixel density difference data is stored in another hierarchic memory 156, located at the succeeding stage of the sorting circuit 152, in order from the smallest to the largest. This forms a hierarchic structure for the plural pieces of pixel density difference data obtained for the corresponding image segment pairs $P_{ij}$, $Q_{ij}$ of the partial image areas 10a, 12a.

An AND circuit 158, coupled to the hierarchic memories 154 and 156, searches the correlation data and pixel density difference data stored in these memories for the ones which are within a specific high rank and specify a common image segment pair. Assume that the specific rank is the highest 5 data in the hierarchic memories 154 and 156. If there exists an image segment pair that has both the correlation data and pixel density difference data ranked at the top in those memories 154, 156, this pair is considered to have yielded a misalignment vector with the highest reliability. Naturally, that image segment pair would be selected without reservation. If there exists an image segment pair which has the correlation data ranked as the second best in the hierarchic memory 154 and the pixel density difference data ranked as the third in the hierarchic memory 156, this pair is also selected because the misalignment vector of such a pair is considered to have a relatively high reliability. An image segment pair with the best correlation data or pixel density difference data but the other data being ranked below the fifth would not be selected. For example, an image segment pair with the best correlation data but with the seventh rank pixel density difference data would not be selected. A memory 160 coupled to the AND circuit 158 exclusively stores the area number (number of an element of a matrix) of the thus selected image segment pair. This sorting manner provides an image segment pair or pairs with a higher correlation coefficient and a smaller sum of the absolute values of pixel density differences. It can be said that the misalignment vector data obtained for the selected image segment pair (or pairs) has a high reliability.

A position-adjusting address controller 162 is coupled to the final misalignment data memory 144 shown in FIG. 3. This controller 162 finds out the position data of the image segment pair (or pairs) having the highly-reliable misalignament data stored in the memory 160 and accesses the memory 144 to extract the final or converged misalignment data that is actually calculated for the concerned image segment pair (or pairs). Based on the reliable misalignment data, the address controller 162, which is also coupled to the image memories 66 and 74, compensates for the misalignment between the image pictures 10, 12. When the extracted partial image areas 10a, 12a are regions of interest for a medical examination, a fine misalignment compensation can be performed on those image areas 10a and 12a. When the misalignment between the original image pictures is considered uniform over the entire picture plane, the overall alignment of the image pictures 10, 12 can be accurately carried out based on the mean vector of the selected reliable misalignment data.

According to the imaging system incorporating the image alignment apparatus embodying the present invention, first, desired partial image areas 10a, 12a, which interest an operator or include clear properties, are extracted from a pair of targets, i.e., image pictures 10, 12. Each of the extracted areas 10a, 12a is divided into a plurality of image segments arranged in a matrix form. An arbitrary pair of segments ($P_{ij}$, $Q_{ij}$) corresponding to each other is selected from among these image segments and the misalignment vector between the pair is then calculated. After the misalignment vector calculation is completed for one image segment pair, a final misalignment vector is stored in the memory 144. Then, the same misalignment vector calculation is taken with the next image segment pair until all the image segment pairs are involved.

It should be noted that the misalignment detection for each pair of corresponding image segments is performed in two steps. The first step is the coarse misalignment detection mode in which the detection is carried out based on the correlation data for the image segment pair calculated as one of the pair is finely shifted around on the image plane. The second step is the fine misalignment detection mode in which the detection is carried out based on the evaluation function P(xy) and further depending on the pixel density difference data between the image segment pair. These two steps, involving not only the correlation data but also the pixel density difference data as two evaluation parameters, will yield significantly reliable final misalignment vector information. The first detection mode is switched to the second mode when the variation in the correlation data updated in the coarse misalignment detecting circuit 70 falls below a specific reference level or threshold level. Such a level is set by the threshold value generator 106 included in the coarse misalignment detecting circuit 70.

It can be said that the matching of the image segment pair has been approximately detected at the time the correlation data between the pair reaches the threshold level. Therefore, the misalignment vector can be obtained by calculating the displacement between the center coordinations of the image segments. However, the present invention does not stop the detection at this stage but goes further into a finer misalignment detection. A new evaluation function based on the correlation data and pixel density difference data is introduced in the second detection mode, thus ensuring finer detection of alignment between the associated image segment pair. The above-discussed point is one important technical feature of the present invention.

Another important feature resides in that one piece of misalignment vector data with a significantly high reliability is selected from the plural pieces of misalignment vector data obtained by repeating the aforementioned detection procedures for every image segment pair. The correlation data and pixel density difference data of each image segment pair are separately sorted to search for an image segment pair (or pairs) with good characteristics in both data. The segment pair or pairs are extracted as being significantly reliable. As a result, an accuracy in detecting regional misalignment vectors between the partial image areas 10a, 12a, i.e., regions of interest, can further be improved. Therefore, even when the misalignment vector between medical-purpose picture images or satellite-transmitted images is uniform over the entire image plane, accurate alignment can be realized for at least a part of a region of interest. Further, even when noise is included in the partial image areas 10a, 12a, the process of selecting image segment pairs with high reliability can exclude those with lower reliability resulting from noise. This provides a highly accurate and reliable image alignment process which is substantially free of adverse noise effects. This further improves image synthesis. Thus, the image position alignment technique of the present invention can significantly contribute to image synthesis used in medical purposes, satellite-image processing, etc.

Although the present invention has been shown and described with reference to a particular embodiment, various changes and modifications which are obvious to any persons skilled in the art to which the invention pertains are deemed to lie within the scope of the invention.

For example, the evaluation function for specifying the quantity of a misalignment may be a combination of other indices than the correlation coefficient and pixel density difference which also represent the quantity image alignment. In the aforementioned embodiment, the information of pixel densities is used for the correlation coefficient and pixel density difference. However, when a distinctive common characteristic is obviously seen between two image pictures, the alignment process can be performed paying attention only to that characteristic. In addition, the misalignment vector quantity obtained for each pair of partial image areas with high reliability may be used directly to correct the image position of that particular pair, thus aligning the associated image pictures segment by segment.

What is claimed is:

1. An image processing apparatus comprising:
first processor means for extracting a desired partial image area from each of a pair of first and second images to be subjected to position alignment;
second processor means for dividing each of said partial image areas into n x m image segments arranged in a matrix form, where n and m are positive integers;
third processor means for detecting, in a first mode, misalignment between each corresponding image segment pair of said first and second picture images by using a first evaluation parameter defined based upon correlation coefficient data, and for more accurately detecting, in a second mode, the misalignment between the same image segment pair of said first and second picture images by using a second evaluation parameter which is defined based upon pixel density difference data as well as the correlation coefficient data; and
fourth processor means for aligning said first and second picture images based on misalignment data obtained for all of said image segment pairs by said third processor means.

2. The apparatus according to claim 1, wherein said third processor means comprises:
first calculator means for sequentially calculating said correlation coefficient data, when said first detection mode is carried out, by shifting at least one of said corresponding image segment pair around an initial position on an image plane in such a manner that each shifting from said initial position makes the image segments before and after the shifting has some overlapping portions therebetween; and
first maximum detector means for determining maximum one piece of correlation data among plural pieces of said correlation data calculated for each pair of said corresponding image segments.

3. The apparatus according to claim 2, wherein said third processor means further comprises:
mode controller means, connected to said first maximum detector means, for electrically storing a threshold value of said correlation data and switching the detection mode from said first detection mode to said second detection mode when a variation in the correlation data between said image segment pairs, sequentially detected, decreases to fall below said threshold value.

4. The apparatus according to claim 3, wherein said third processor means further comprises:

second calculator means for summing the magnitudes of pixel density differences for each of said image segment pairs in said second detection mode to produce said pixel density difference data;

normalizer means, connected to said first calculator means and second calculator means, for normalizing said correlation data and pixel density difference data; and third calculator means, connected to said normalizer means, for calculating said second evaluation parameter based on said normalized correlation data and pixel density difference data.

5. The apparatus according to claim 4, wherein said third processor means further comprises:

second maximum detector means for updating said second evaluation parameter to determine maximum one among a plurality of said second evaluation parameters calculated for each image segment pair;

mode termination means, coupled to said second maximum detector means, for electrically storing a threshold value of said second evaluation parameter and terminating said second detection mode performed for the associated image segment pair by said third processor means when said updated second evaluation parameter exceeds said threshold value; and fourth calculator means for detecting center addresses of each of said image segment pairs put through said second detection mode and calculating a misalignment between said center addresses.

6. The apparatus according to claim 5, further comprising fifth processor means for sorting final correlation data and pixel density difference data, which are respectively obtained in said first and second detection modes for all of said image segment pairs of said partial image areas, for searching all of said image segment pairs for at least one image segment pair having both correlation data and pixel density difference data highly ranked and for calculating a misalignment vector between said at least one image segment pair.

7. The apparatus according to claim 6, wherein said fifth processor means comprises:

a first hierarchic memory for storing said plural pieces of final correlation data for all of said image segment pairs in order from the largest to the smallest;

a second hierarchic memory for storing said plural pieces of final pixel density difference data for all of said image segment pairs in order from the smallest to the largest; and circuit means, coupled to said first and second hierarchic memories, for extracting at least one image segment pair with the correlation data and pixel density difference data both being in a specific high rank and for specifying misalignment vector data of said at least one image segment pair.

8. An image processing method comprising the steps of:

extracting a desired partial image area from a pair of first and second picture images to be aligned;

dividing each of said partial image areas into n x m image segments arranged in a matrix form, where n and m are positive integers;

sequentially calculating first evaluation function defined based on correlation data between a selected one of corresponding n x m image segment pairs while shifting one of the selected image segment pair on an image plane, thereby performing a first misalignment detection between said image segment pair;

terminating said first misalignment detection when a variation in said first evaluation function falls below a predetermined first threshold level, detecting a maximum of said first evaluation function and calculating a misalignment between the image segment pair at the time said maximum first evaluation function is detected;

sequentially calculating a second evaluation function including said correlation data and pixel density difference data between the selected image segment pair to thereby perform a second misalignment detection; and calculating, when a maximum of the calculated second evaluation function exceeds a predetermined second threshold level, a misalignment quantity between the selected image segment pair at the time said maximum second evaluation function is detected and terminating said second misalignment detection, whereby final misalignment vector data for the selected image segment pair is obtained.

9. The method according to claim 8, further comprising a step of repeatedly performing said first and second misalignment detections for the image segment pairs other than said selected image segment pair, thus providing final misalignment vector data for all of said n x m image segment pairs included in said partial image areas of said first and second images.

10. The method according to claim 9, further comprising the steps of:

separately sorting plural pieces of final correlation data and pixel density difference data obtained for all of said image segment pairs;

searching said all of said image segment pairs for at least one image segment pair having those correlation data and pixel density difference data which are both in a predetermined high rank; and specifying the misalignment quantity between said at least one image segment pair as highly reliable misalignment data and utilizing said specified misalignment quantity for aligning said first and second images.

11. The method according to claim 9, further comprising the steps of:

sorting said final correlation data in order from the largest to the smallest to form a hierarchic structure for said correlation data;

sorting said final pixel density difference data in order from the smallest to the largest to form a hierarchic structure for said pixel density difference data;

searching all of said image segment pairs for at least one image segment pair having those correlation data and pixel density difference data which are both in a predetermined high rank; and specifying the misalignment quantity between said at least one image segment pair as highly reliable misalignment data and utilizing said specified misalignment quantity for aligning said first and second images.

* * * * *